US006667766B2

(12) United States Patent
Matsutani et al.

(10) Patent No.: US 6,667,766 B2
(45) Date of Patent: Dec. 23, 2003

(54) METHOD OF REMOVING NOISE FROM IMAGE SIGNAL

(75) Inventors: Takashi Matsutani, Osaka (JP); Gen Sasaki, Osaka (JP)

(73) Assignee: Mega Chips Corporation, Osaka (JP)

( * ) Notice: Subject to any disclaimer, the term of this patent is extended or adjusted under 35 U.S.C. 154(b) by 0 days.

(21) Appl. No.: 10/014,357

(22) Filed: Dec. 14, 2001

(65) Prior Publication Data

US 2002/0105583 A1 Aug. 8, 2002

(30) Foreign Application Priority Data

Dec. 15, 2000 (JP) ........................................ 2000-382452

(51) Int. Cl.[7] .............................................. H04N 5/217
(52) U.S. Cl. ........................................ 348/241; 358/463
(58) Field of Search ............................ 348/241; 358/463

(56) References Cited

U.S. PATENT DOCUMENTS

| 4,573,070 A | * | 2/1986 | Cooper | ........................ 348/617 |
| 4,661,853 A | * | 4/1987 | Roeder et al. | ............... 348/701 |
| 4,918,633 A | * | 4/1990 | Sullivan | ........................ 382/275 |
| 5,347,590 A | * | 9/1994 | Nonnweiler et al. | ........ 382/132 |
| 5,519,456 A | * | 5/1996 | Inamori | ........................ 348/699 |
| 6,459,734 B1 | * | 10/2002 | Kato et al. | ............. 375/240.12 |

* cited by examiner

*Primary Examiner*—Andrew Christensen
*Assistant Examiner*—Dorothy Wu
(74) *Attorney, Agent, or Firm*—Oblon, Spivak, McClelland, Maier & Neustadt, P.C.

(57) ABSTRACT

In order to provide a noise removal method for removing noise signals mixed into an image signal without deteriorating picture quality of the overall image, such zigzag noise signals that the difference between the output levels of two pixels adjacent to each other along a noise generation direction alternately takes positive and negative vales at least three times are detected from noise signals mixed into an image signal. Then, a specific pixel is noted among a plurality of pixels corresponding to the noise signals, for calculating a mean value of the output levels of the noise signals with reference to the specific pixel and correcting the output level of a noise signal corresponding to the said specific pixel with the said mean value.

5 Claims, 10 Drawing Sheets

F I G . 1 ( a )
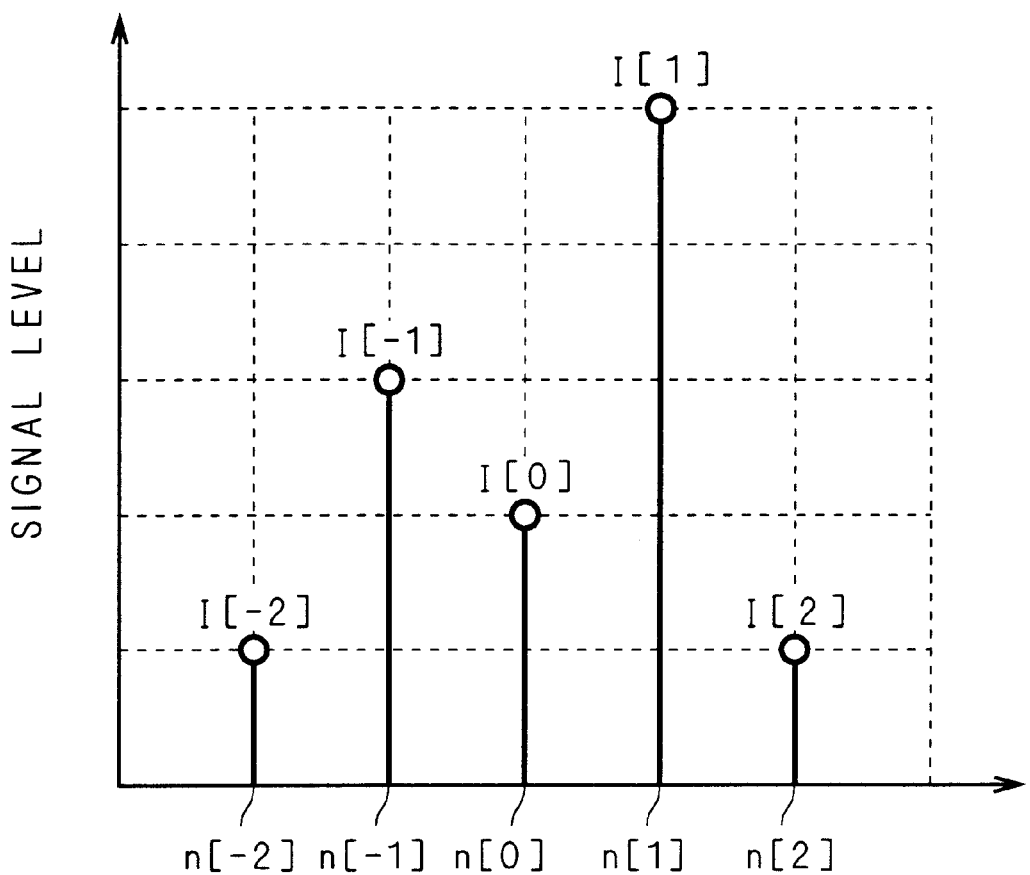
F I G . 1 ( b )
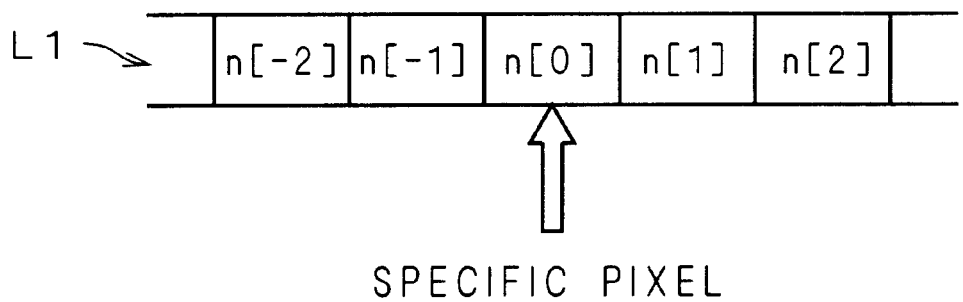
SPECIFIC PIXEL

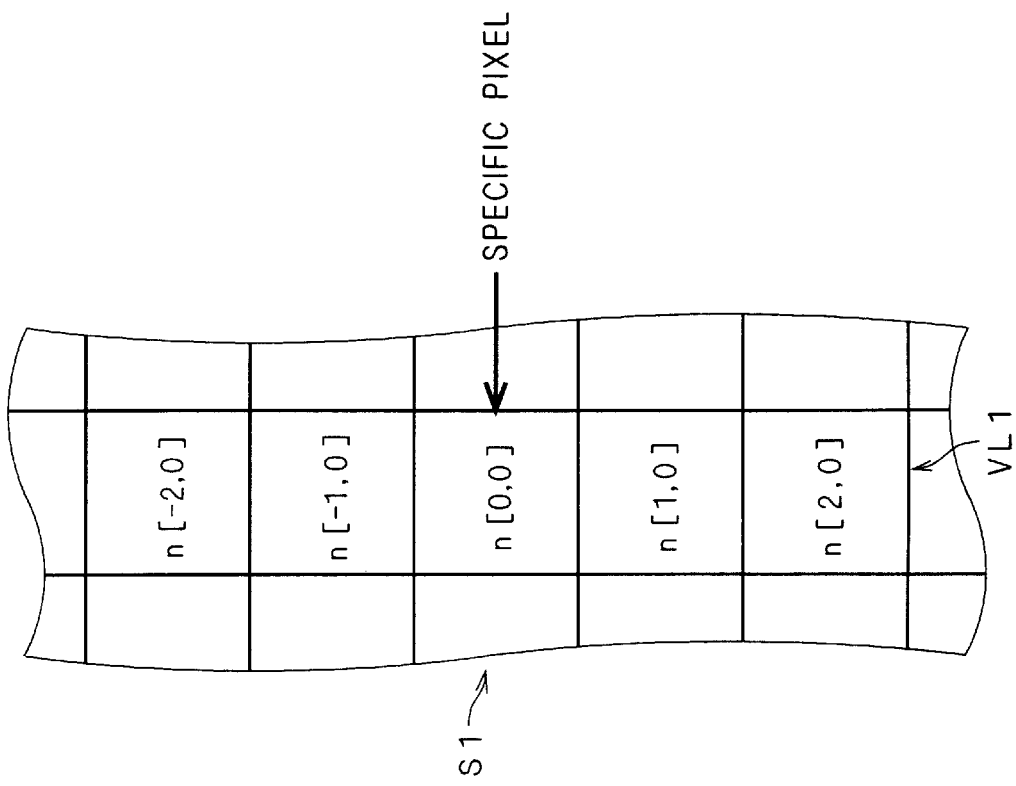
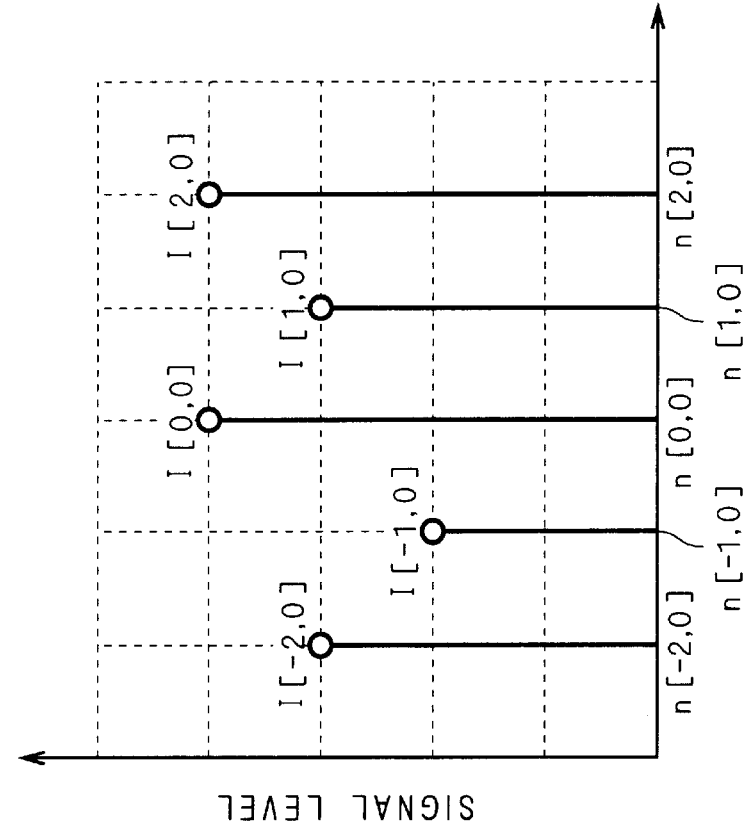

METHOD OF REMOVING NOISE FROM IMAGE SIGNAL

BACKGROUND OF THE INVENTION

1. Field of the Invention

The present invention relates to a noise removal method for detecting and removing noise appearing in an image signal picked up with an image pickup sensor such as a digital camera.

2. Description of the Background Art

FIG. 10 is a schematic block diagram of a general digital still camera 100. In the digital still camera 100, an analog image signal picked up with an image pickup sensor 105 such as a CCD (charge coupled device) sensor or a CMOS sensor is converted to a digital signal and thereafter subjected to various image processing such as pixel interpolation, color space conversion and edge enhancement in an image processing part 106, as shown in FIG. 10. The Image data subjected to such image processing is culled and finder-displayed on a liquid crystal monitor 109 or the like, compression-coded in the image processing part 106 using JPEG (joint photographic experts group) compression-coding or the like and stored in a memory card 110 such as a nonvolatile memory, or output to an external device such as a personal computer through an interface 111. Referring to FIG. 10, numeral 101 denotes an optical lens, numeral 102 denotes a color correction filter, numeral 103 denotes an optical LPF (low-pass filter), numeral 104 denotes a color filter array, and numeral 107 denotes a driving part driving/controlling the image sensor 105 and the like.

However, a noise signal is disadvantageously mixed into the image signal picked up with the aforementioned image pickup sensor 105, to deteriorate the picture quality. When the image signal mixed with the noise signal is subjected to edge enhancement, the noise signal is also enhanced to further deteriorate the picture quality. This type of noise signal results from the hardware structure of an A/D converter or employment of pixel values around a noted specific pixel in pixel interpolation, for example. It is difficult to individually remove this type of noise signal, and hence the overall image signal is generally passed through the LPF 103 for blurring the noise signal appearing in the image signal. In this case, however, the edge-enhanced part is also blurred to disadvantageously reduce the overall picture quality.

SUMMARY OF THE INVENTION

According to a first aspect of the present invention, a method of removing noise from an image signal comprises steps of (a) detecting such a zigzag signal that the difference between the output levels of two adjacent pixels alternately takes positive and negative values at least three times in pixel arrangement along a prescribed direction and (b) noting a specific pixel among a plurality of pixels corresponding to the zigzag signal and calculating a mean value of the output levels of signals corresponding to the plurality of pixels with reference to the specific pixel for correcting the output level of a signal corresponding to the specific pixel to said mean value.

The method according to the first aspect can extract a noise signal having a zigzag output level appearing around a Nyquist frequency and individually correct the same. Therefore, the zigzag noise signal can be removed without deteriorating the overall picture quality.

According to a second aspect of the present invention, the zigzag signal is generated as a straight line in the image signal in the step (a), and the method calculates a weighted mean of the output level of the zigzag signal with reference to the specific pixel for correcting the output level of the signal corresponding to the specific pixel to the weighted mean in the step (b).

The method according to the second aspect can remove a generated noise signal as a straight line appearing around the Nyquist frequency from the image signal in higher accuracy.

According to a third aspect of the present invention, the image signal is a two-dimensional image signal formed by horizontal and vertical lines, and the zigzag signal is intersectionally generated in two directions of the horizontal and vertical lines in the image signal in the step (a), while the method calculates a weighted mean of the output level of the zigzag signal generated along the two directions with reference to the specific pixel at the intersection of the horizontal and vertical lines for correcting the output level of the signal corresponding to the specific pixel to the weighted mean in the step (b).

The method according to the third aspect can detect a noise signal at the intersection of two zigzag noise signals appearing in two directions of vertical and horizontal lines from a two-dimensional image signal and remove the same in high accuracy.

Accordingly, an object of the present invention is to provide a noise removal method for individually removing a noise signal mixed into an image signal without lowering picture quality.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIGS. 1(a) shows signal levels corresponding to respective pixels of a line sensor and FIG. 1(b) schematically shows pixel arrangement of the line sensor for illustrating a noise removal method according to an embodiment 1 of the present invention;

FIGS. 4(a) shows signal levels corresponding to respective pixels of a line sensor and FIG. 4(b) schematically shows pixel arrangement of the line sensor for illustrating a noise removal method according to an embodiment 2 of the present invention;

DESCRIPTION OF THE PREFERRED EMBODIMENTS

Embodiment 1

Figure 2:
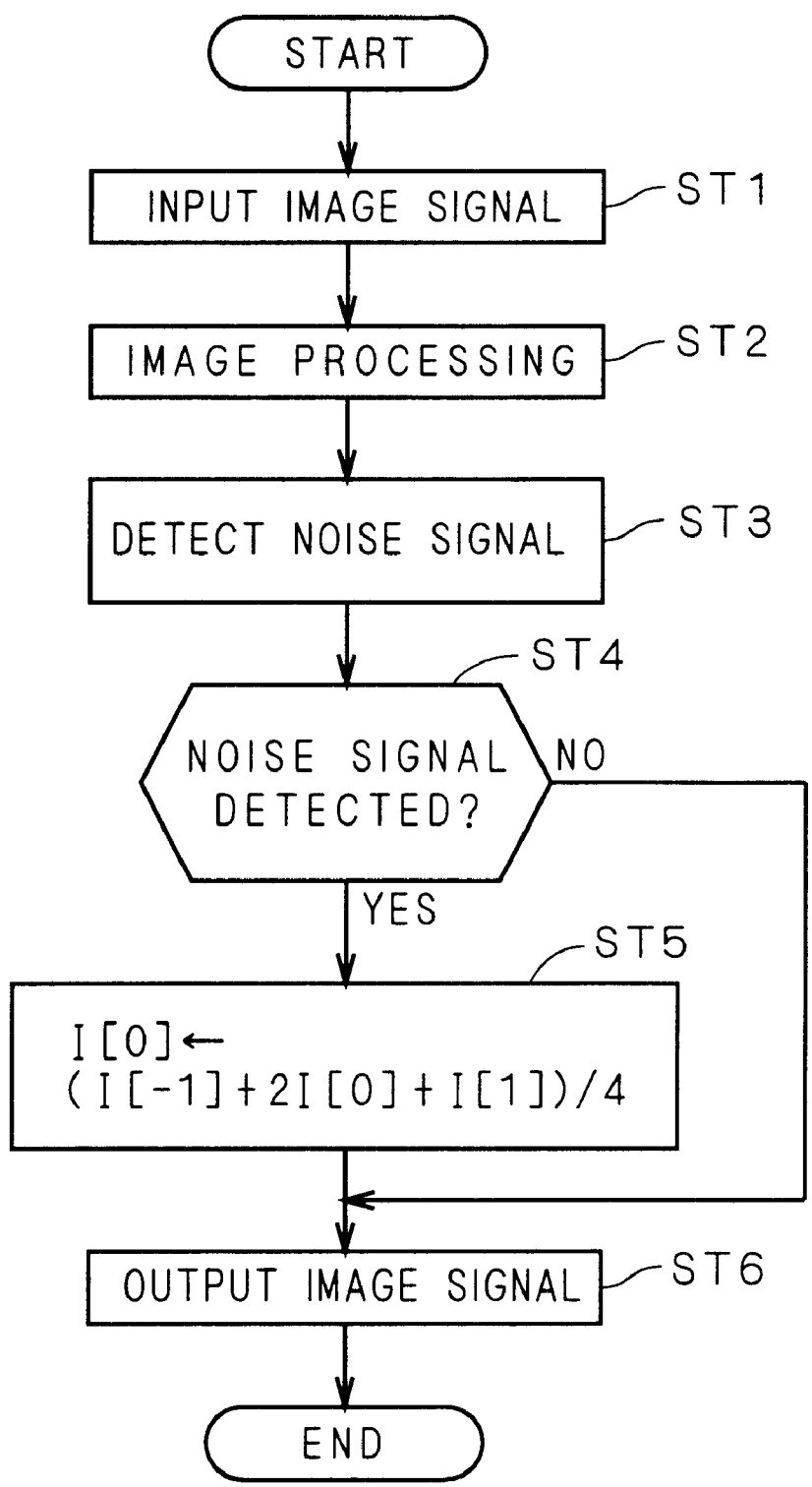
FIG. 2 is a flow chart showing a procedure of detecting and removing noise signal levels shown in FIG. 1(a)

FIGS. 1(a) and 1(b) are schematic diagrams for illustrating a noise removal method according to an embodiment 1 of the present invention. FIG. 1(a) illustrates the output noise signal levels (hereinafter referred to as noise signal levels) of signals corresponding to respective pixels of a line sensor such as a CCD sensor or a CMOS sensor, and FIG. 1(b) schematically shows pixel arrangement L1 of the line sensor. The line sensor having the one-dimensional pixel arrangement L1 shown in FIG. 1(b) is formed by linearly arranging a plurality of photodiodes, and symbols n[−2], n[−1], n[0], n[1], n[2], ... denote pixels corresponding to the photodiodes respectively.

As shown in FIG. 1(a), noise signal levels I[−2], I[−1], I[0], I[1], I[2], ... are detected in correspondence to the pixels n[−2], n[−1], n[0], n[1], n[2], ... respectively. These types of noise signal levels are detected when having zigzag values. The output levels of these noise signals are detected when the difference between the signal levels of two pixels adjacent to each other in a noise generation direction repetitively changes while alternately taking positive and negative values at least three times such that the difference is positive, negative, positive, negative, ..., specifically speaking when satisfying at least either one of the following conditional expressions (A-1) and (A-2):

$$I[-2]<I[-1], \text{ and } I[-1]>I[0], \text{ and } I[0]<I[1] \quad (A\text{-}1)$$

$$I[2]<I[1], \text{ and } I[1]>I[0], \text{ and } I[0]<I[-1] \quad (A\text{-}2)$$

A noise signal satisfying either the aforementioned conditional expression (A-1) or (A-2) is determined as a signal around a Nyquist frequency, and not regarded as an original image signal. The term "Nyquist frequency" stands for the inverse number of the maximum separation in time (Nyquist interval) which can be given to regularly spaced instantaneous samples of a wave of specified bandwidth for complete determination of the waveform of signal. This type of noise signal readily appears around the Nyquist frequency, to be mixed into the original signal due to the hardware structure of an A/D converter or in pixel interpolation. When a color filter array of a primary color system of "R (red component)", "G (green component)" and "B (blue component)" is arranged in correspondence to respective pixels in a photosensitive part of an image pickup sensor, for example, every pixel of an image signal output from the image pickup sensor is subjected to pixel interpolation for interpolating the remaining two color components with the pixel value of the color component around the pixel. As to a pixel having original data of an "R" component, for example, "B" components of four pixels obliquely adjacent to this pixel are arithmetically averaged thereby calculating pixel interpolation data of the remaining color components not provided in this pixel. It has been proven that difference in signal level is readily caused between the pixel interpolation data and the original data to readily result in a noise signal having the aforementioned zigzag value.

FIG. 2 is a flow chart showing an exemplary procedure of detecting and removing the output level of such a zigzag noise signal. As shown in FIG. 2, an image signal picked up by the line sensor L1 is A/D converted and thereafter input in an image processing part (not shown) (ST1), and subjected to image processing such as pixel interpolation, color space conversion and edge enhancement (ST2).

Then, the process shifts to a step ST3 for examining the signal level processed in the aforementioned steps ST1 and ST2 and determining whether or not a noise signal satisfying the aforementioned conditional expression (A-1) or (A-2) is mixed into the same (ST4). When detecting the noise signal satisfying the aforementioned conditional expression (A-1) or (A-2), the process shifts to a step ST5.

When detecting no noise signal satisfying the aforementioned conditional expression (A-1) or (A-2), on the other hand, the process shifts to a step ST6 for outputting an uncorrected image signal and ending the noise removal processing at the step ST6.

At the step ST5, a signal level I[0] corresponding to a specific pixel n[0] to be corrected is corrected to:

$$I[0] \leftarrow \sum_{i=1}^{m} \frac{2I[0]+I[i]+I[-i]}{4m} \quad (F1)$$

(m : natural number)

Thus, a noise signal can be removed from the specific pixel. The above formula (F1) expresses an arithmetic mean value of 4 m noise signal levels. When m=1, the signal level I[0] can be corrected to a value (2×I[0]+I[1]+I[−1])/4. In the above formula (F1), it is particularly preferable that the value m is a two's exponentiation ($2^n$: n represents an integer of at least 0). This is because the structure of carrying out division by the two's exponentiation ($2^{n+2}$) is ordinarily implemented by a shift arithmetic unit in hardware, and a divider having a large gate scale is required to complicate the circuit structure when performing division by a numerical value other than the two's exponentiation. After the corrected image signal is output at the subsequent step ST6, the noise removal processing according to the embodiment 1 is ended.

While the noise signal is detected and corrected at the aforementioned steps ST3 to ST5 after serial image processing such as image interpolation, color space conversion and edge enhancement is executed at the aforementioned step ST2 in the above noise removal processing, the embodiment 1 of the present invention is not restricted to this but the aforementioned steps ST3 to ST5 may be assembled into the serial image processing in the aforementioned step ST2. For example, color space conversion and edge enhancement may be executed after executing image interpolation in the image processing at the aforementioned step ST2 and thereafter detecting and correcting the noise signal at the aforementioned steps ST3 to ST5.

Thus, the embodiment 1 can detect the noise signal having an output level changing in a zigzag manner and individually remove the same, whereby a noise signal resulting from the hardware structure of an A/D converter or particularly a noise signal resulting from pixel interpolation can be removed without reducing the overall picture quality.

Modification of Embodiment 1

Figure 3A:
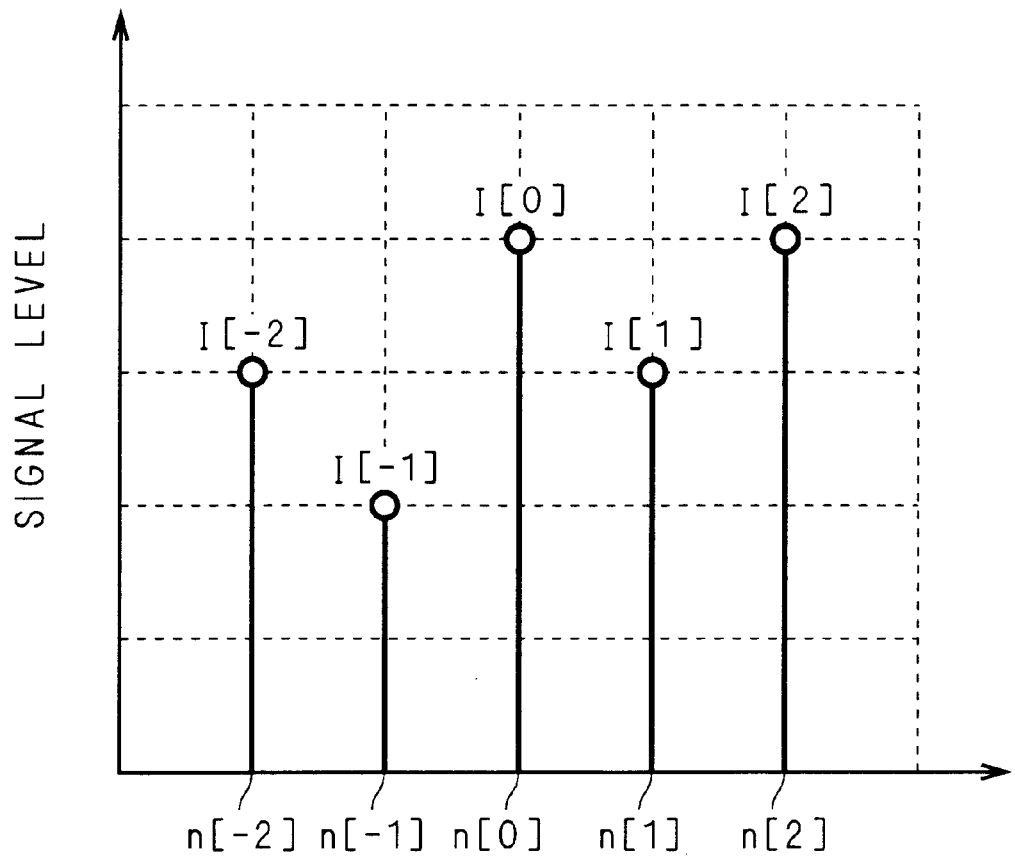
FIG. 3(a) illustrates signal levels corresponding to respective pixels of a line sensor, and FIG. 3(b) schematically shows pixel arrangement of the line sensor.
Figure 3B:
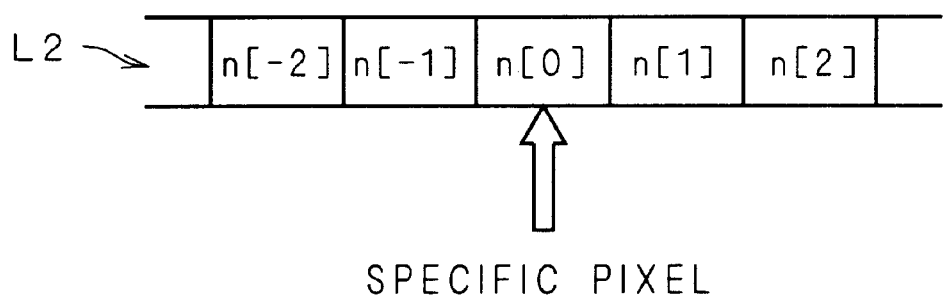

Noise signals shown in FIG. 3(a) may alternatively be detected in place of the noise signals shown in FIG. 1(a). FIG. 3(a) illustrates signal levels corresponding to respective pixels of a line sensor such as a CCD sensor or a CMOS sensor, and FIG. 3(b) schematically shows pixel arrangement L2 of the line sensor. Similarly to the aforementioned line sensor, the line sensor shown in FIG. 3(b) is formed by linearly arranging a plurality of photodiodes, and symbols n[−2], n[−1], n[0], n[1], n[2], . . . denote pixels corresponding to the photodiodes respectively. Further, zigzag noise signal levels I[−2], I[−1], I[0], I[1], I[2], . . . are detected in correspondence to the pixels n[−2], n[−1], n[0], n[1], n[2], . . . respectively, as shown in FIG. 3(a). In other words, noise signals satisfying at least either one of the following conditional expressions (B-1) and (B-2) are detected:

$$I[-2]>I[-1], \text{ and } I[-1]<I[0], \text{ and } I[0]>I[1] \tag{B-1}$$

$$I[2]>I[1], \text{ and } I[1]<I[0], \text{ and } I[0]>I[-1] \tag{B-2}$$

Noise removal processing according to this modification may be executed by employing the above conditional expressions (B-1) and (B-2) in place of the aforementioned conditional expressions (A-1) and (A-2) in the aforementioned embodiment 1. Thus, an effect similar to that of the aforementioned embodiment 1 can be attained.

Embodiment 2

Figure 5A:
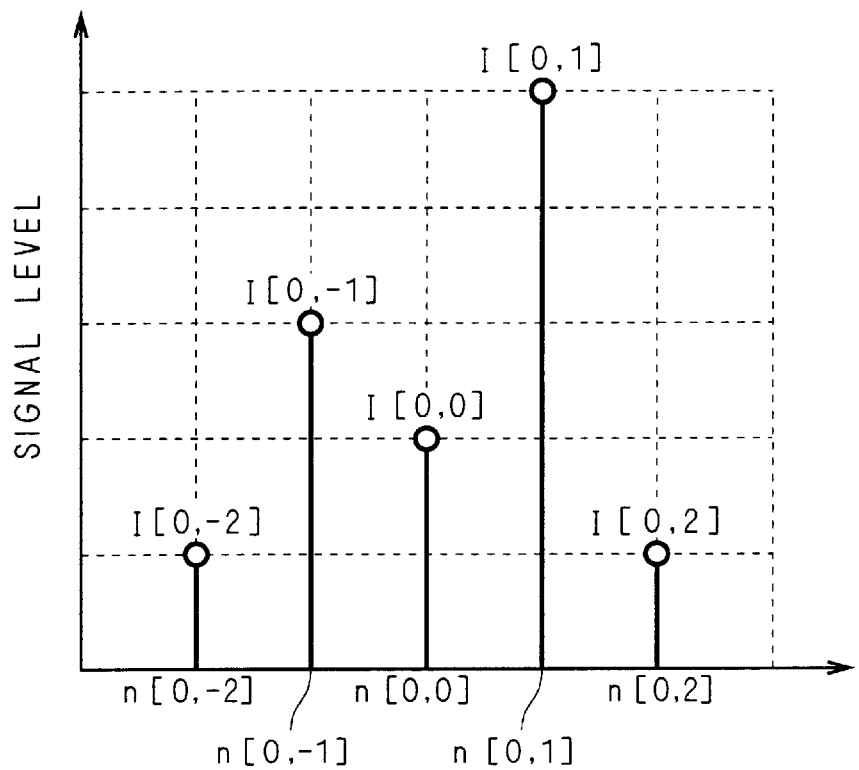
FIGS. 5(a) shows signal levels corresponding to respective pixels of an image pickup sensor and FIG. 5(b) schematically shows pixel arrangement of the image pickup sensor for illustrating the noise removal method according to the embodiment 2 of the present invention.
Figure 5B:
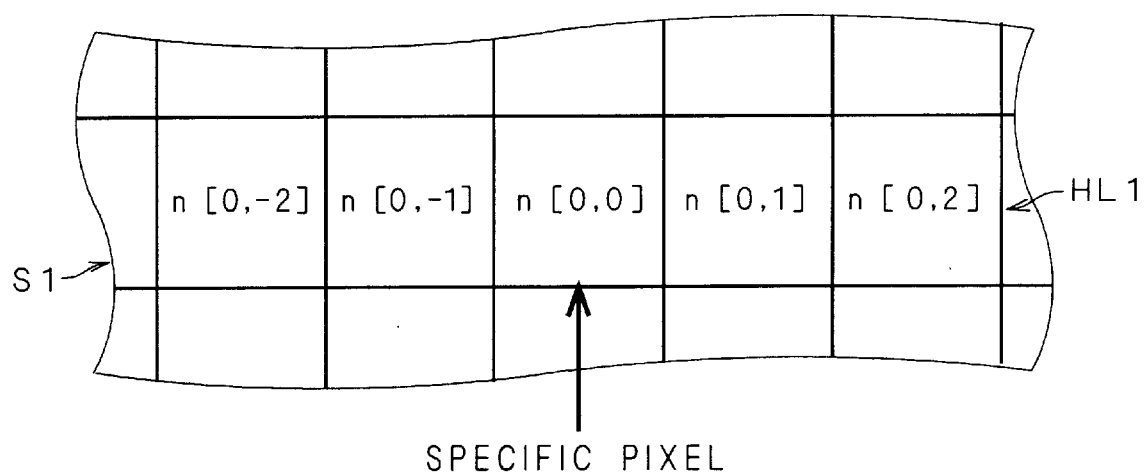

The noise removal method according to the aforementioned embodiment 1 may alternatively be applied to an image pickup sensor of two-dimensional pixel arrangement consisting of horizontal and vertical lines. FIGS. 4(a), 4(b), 5(a) and 5(b) are schematic diagrams for illustrating a noise removal method according to an embodiment 2 of the present invention. FIG. 4(a) illustrates signal levels corresponding to respective pixels of a vertical line VL1 of an image pickup sensor having two-dimensional pixel arrangement, FIG. 4(b) schematically shows pixel arrangement S1 of the image pickup sensor, FIG. 5(a) illustrates signal levels corresponding to pixels of a horizontal line HL1 of the image pickup sensor having the two-dimensional pixel arrangement, and FIG. 5(b) schematically shows pixel arrangement S1 of the image pickup sensor.

FIG. 4(a) shows zigzag noise signal levels I[−2, 0], I[−1, 0], I[0, 0], I[1, 0], I[2, 0], . . . appearing on pixels n[−2, 0], n[−1, 0], n[0, 0], n[1, 0], n[2, 0], . . . of the vertical line VL1 shown in FIG. 4(b). FIG. 5(a) shows zigzag noise signal levels I[0,−2], I[0, −1], I[0, 0], I[0, 1], I[0, 2], appearing on pixels n[0,−2], n[0,−1], n[0, 0], n[0, 1], n [0, 2], . . . of the horizontal line HL1. The output levels of these noise levels are detected when the difference between the signal levels of two pixels adjacent to each other in a noise generation direction repetitively changes while alternately taking positive and negative values at least three times such that the difference is positive, negative, positive, negative, . . . , similarly to the case of the aforementioned embodiment 1. As described in the above embodiment 1, these types of zigzag noise signal levels are generated around a Nyquist frequency due to the hardware structure of an A/D converter or image processing, particularly pixel interpolation.

This embodiment is characterized in correcting a signal level I[0, 0] of a specific pixel n[0, 0] of a zigzag noise signal by a weighted mean value calculated by either the following formula (F2) or (F3):

$$I[0, 0] \leftarrow \sum_{i=1}^{m} \frac{2I[0, 0] + I[i, 0] + I[-i, 0]}{4m} \tag{F2}$$

(m: natural number)

$$I[0, 0] \leftarrow \sum_{i=1}^{m} \frac{2I[0, 0] + I[0, i] + I[0, -i]}{4m} \tag{F3}$$

(m: natural number)

The above formulas (F2) and (F3) are correction formulas for noise signals on the vertical and horizontal lines VL1 and HL1 respectively.

Figure 6:
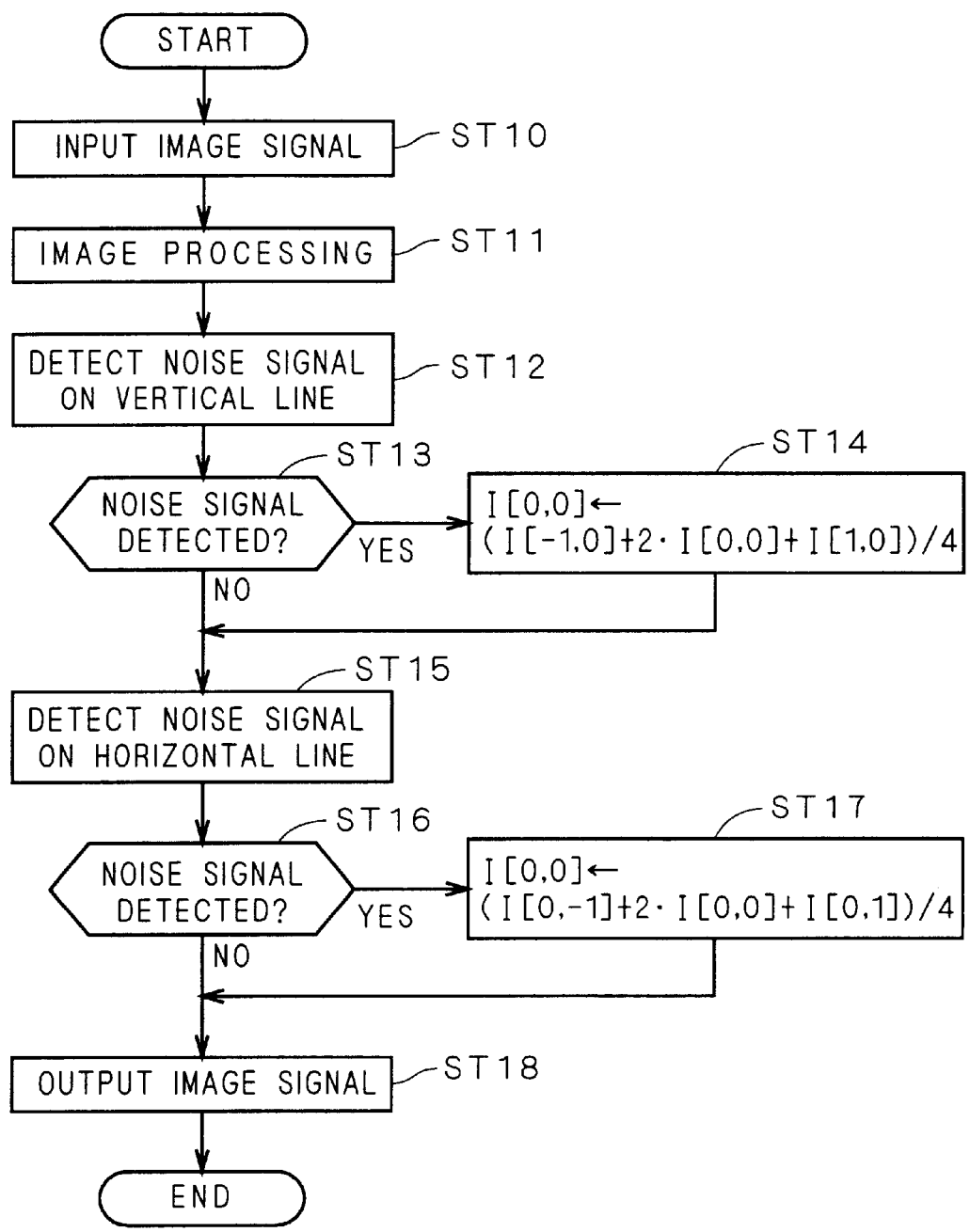
FIG. 6 is a flow chart showing an exemplary procedure of removing zigzag noise signals illustrated in FIGS. 4(a) and 5(a)

FIG. 6 is a flow chart showing exemplary noise removal according to the embodiment 2. This example is described with reference to a case of detecting and correcting five zigzag noise signals on each of the vertical line VL1 and the horizontal line HL1.

Image signals picked up by an image pickup sensor are A/D converted and thereafter input in an image processing part (ST10), to be subjected to image processing such as image interpolation, color space conversion, gamma correction and edge enhancement in the image processing part (ST11). Then, the process shifts to a step ST12, for successively storing the image signals subjected to image processing in five buffer memories (not shown) and performing the aforementioned zigzag noise signal level detection on the stored image signals every vertical line. In other words, detection is executed on a noise signal satisfying any of the following conditional expressions (C-1) to (C-4) among signals corresponding to the pixels n[−2, 0], n[−1, 0], n[0, 0], n[1, 0], n[2, 0], . . . of the vertical line VL1 shown in FIG. 4(b):

$$I[-2, 0]>I[-1, 0], \text{ and } I[-1, 0]<I[0, 0], \text{ and } I[0, 0]>I[1, 0] \tag{C-1}$$

$$I[2, 0]>I[1, 0], \text{ and } I[1, 0]<I[0, 0], \text{ and } I[0, 0]>I[-1, 0] \tag{C-2}$$

$$I[-2, 0]<I[-1, 0], \text{ and } I[-1, 0]>I[0, 0], \text{ and } I[0, 0]<I[1, 0] \tag{C-3}$$

$$I[2, 0]<I[1, 0], \text{ and } I[1, 0]>I[0, 0], \text{ and } I[0, 0]<I[-1, 0] \tag{C-4}$$

Whether or not such a noise signal is detected is determined at a step S13, so that the process shifts to a step ST15 described later when the noise signal is not detected while correction of I[0, 0]←(I[−1, 0]+2×n[0, 0]+n[1, 0])/4 is executed on the noise signal level I[0, 0] of the specific pixel n[0, 0] on the basis of the above formula (F2) at a step ST14 and the process thereafter shifts to the step ST15 when the noise signal is detected.

At the step ST15, a zigzag noise signal level on the horizontal line HL1 is detected. In other words, detection is executed on a noise signal satisfying any of the following conditional expressions (D-1) to (D-4) among signals corresponding to the pixels n[0,−2], n[0,−1], n[0, 0], n[0, 1], n[0, 2], . . . of the horizontal line HL1 shown in FIG. 5(b):

$$I[0, -2]<I[0, -1], \text{ and } I[0, -1]>I[0, 0], \text{ and } I[0, 0]<I[0, 1] \tag{D-1}$$

$$I[0, -2]<I[0, -1], \text{ and } I[0, -1]>I[0, 0], \text{ and } I[0, 0]<I[0, 1] \tag{D-2}$$

$$I[0, -2]>I[0, -1], \text{ and } I[0, -1]<I[0, 0], \text{ and } I[0, 0]>I[0, 1] \tag{D-3}$$

$$I[0, -2]>I[0, -1], \text{ and } I[0, -1]<I[0, 0], \text{ and } I[0, 0]>I[0, 1] \tag{D-4}$$

Whether or not such a noise signal is detected is determined at a step ST16, and the image signals are output at a step ST18 and the aforementioned noise removal processing is ended if the noise signal is not detected, while correction of I[0, 0]←(I[0, −1]+2×n[0, 0]+I[0, 1])/4 is executed on the noise signal level I[0, 0] of the specific pixel n[0, 0] on the basis of the above formula (F3) at a step ST17 and thereafter the image signals from which the noise signal is removed are output (ST18) when the noise signal is detected. The noise removal is thus ended.

While the noise signal is detected and removed through the aforementioned steps ST12 to ST17 after the image processing at the aforementioned step ST11 in the above noise removal, the aforementioned steps ST12 to ST17 may alternatively be assembled into the image processing at the aforementioned step ST11. For example, the aforementioned steps ST12 to ST17 may be executed after executing pixel interpolation at the aforementioned step ST11, for thereafter executing other image processing such as color space conversion and gamma correction.

Thus, according to the embodiment 2, only a zigzag noise signal mixed into image signals output from an image pickup sensor of two-dimensional image arrangement can be extracted and individually removed, whereby it is possible to remove a noise signal around a Nyquist frequency resulting from the hardware structure of an A/D converter or from pixel interpolation without reducing the overall picture quality.

Embodiment 3

Figure 7A:
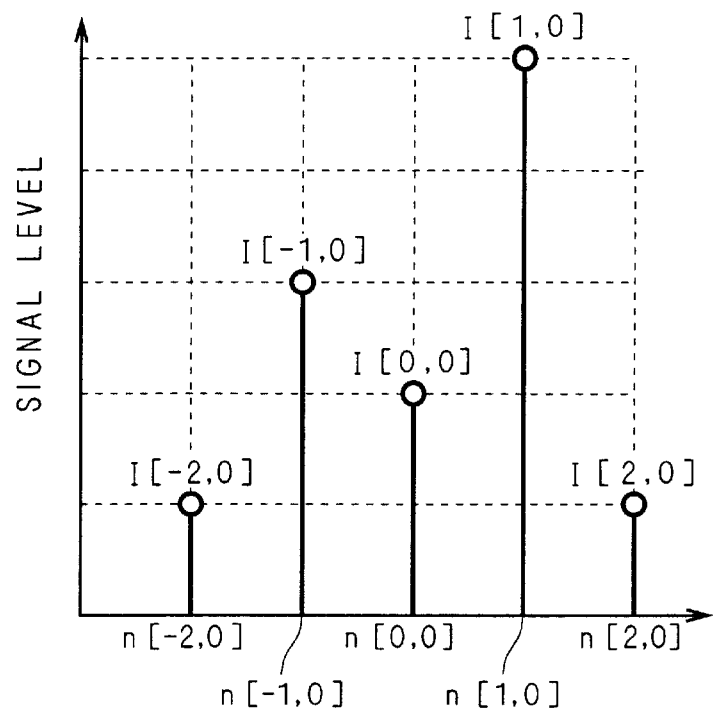
FIG. 7(a) shows signal levels corresponding to respective pixels of a vertical line of an image pickup sensor and FIG. 7(b) shows signal levels corresponding to respective pixels of a horizontal line of the image pickup sensor for illustrating a noise removal method according to an embodiment 3 of the present invention.
Figure 7B:
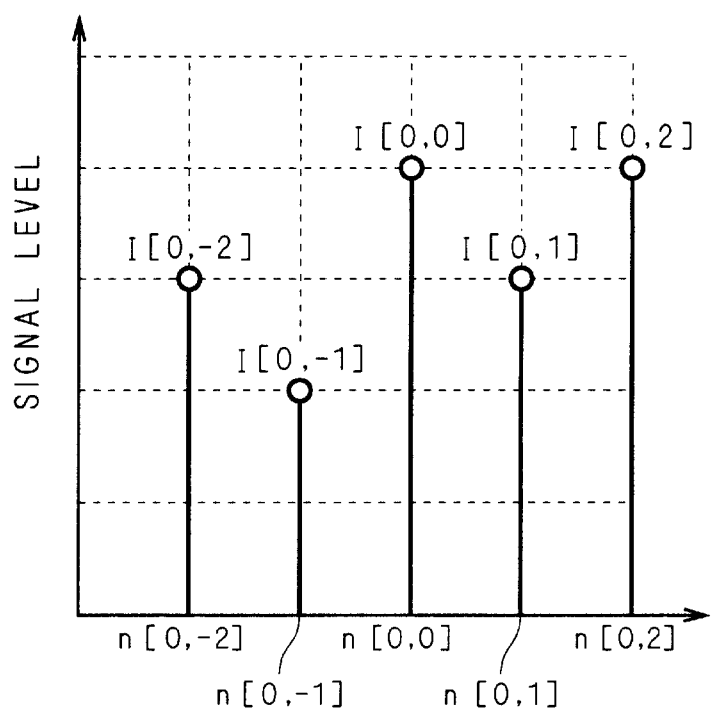
Figure 8:
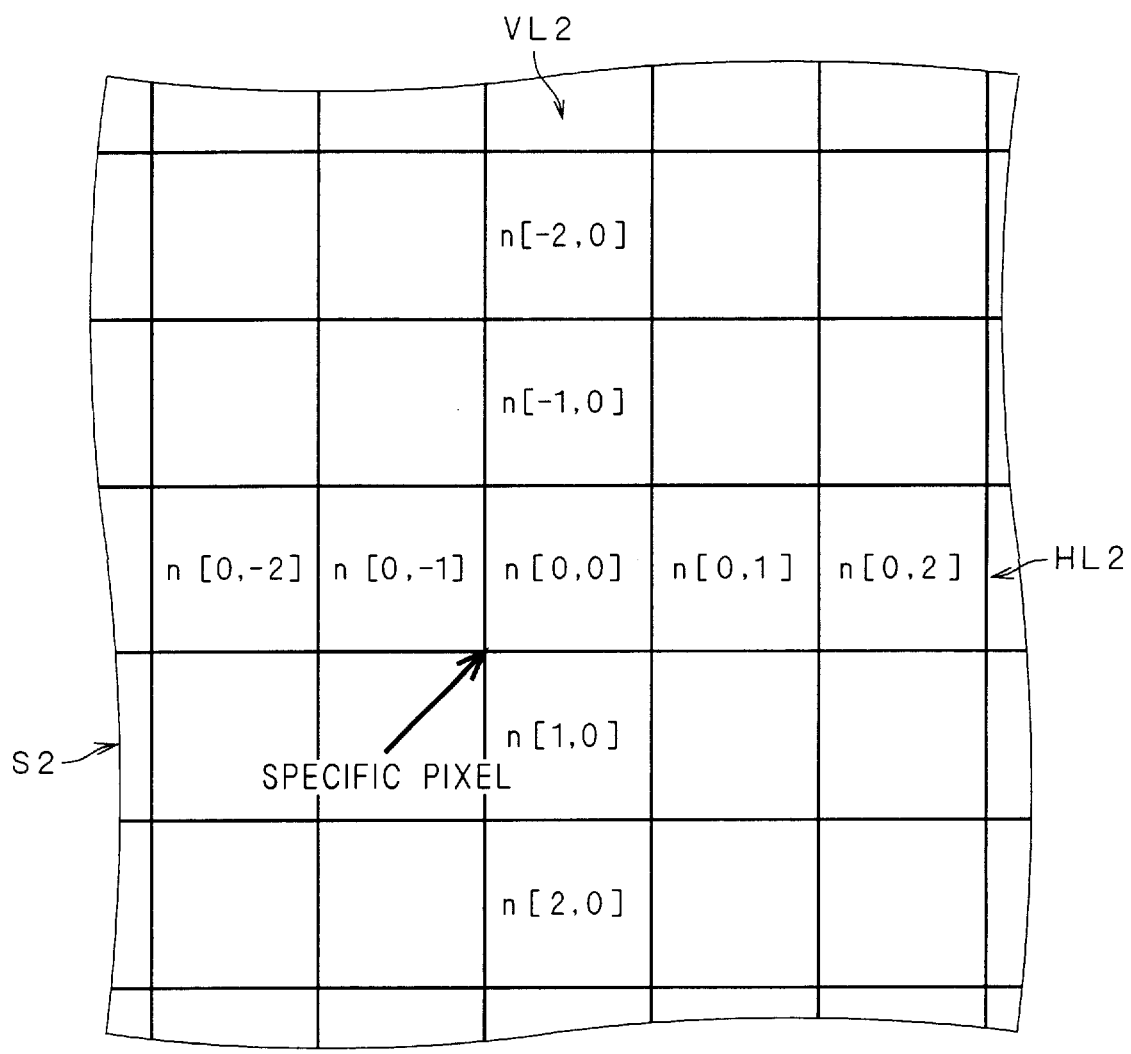
FIG. 8 schematically shows pixel arrangement of the image pickup sensor.

With reference to an embodiment 3 of the present invention, processing performed when a specific pixel n[0, 0] appears on an intersection of horizontal and vertical lines between a zigzag noise signal appearing on a horizontal line and a zigzag noise signal appearing on a vertical line in two-dimensional pixel arrangement of an image pickup sensor is described. FIGS. 7(a) and 7(b) are schematic diagrams for illustrating a noise removal method according to the embodiment 3 of the present invention. FIG. 7(a) illustrates signal levels corresponding to pixels of a vertical line VL2 of an image pickup sensor having two-dimensional pixel arrangement, FIG. 7(b) illustrates signal levels corresponding to pixels of a horizontal line HL2 thereof, and FIG. 8 schematically shows pixel arrangement S2 of the image pickup sensor.

As shown in FIGS. 7(a) and 7(b), pixels n[−2, 0], n[−1, 0], n[0, 0], n[1, 0], n[2, 0], . . . of zigzag noise signal levels appearing on the horizontal line HL2 in the pixel arrangement S2 and pixels n[0,−2], n[0,−1], n[0, 0], n[0, 1], n[0, 2], . . . corresponding to zigzag noise signals appearing on the vertical line VL2 intersect with each other, and a specific pixel n[0, 0] is arranged on the intersection. The embodiment 3 is characterized in correcting an output level I[0, 0] of a noise signal in the specific pixel n[0, 0] with a weighted mean value calculated in the following formula (F4) in such a case:

$$I[0, 0] \leftarrow \sum_{i=1}^{m} \frac{4I[0, 0] + I[0, i] + I[0, -i] + I[i, 0] + I[-i, 0]}{8m} \quad (F4)$$

(m : natural number)

Figure 9:
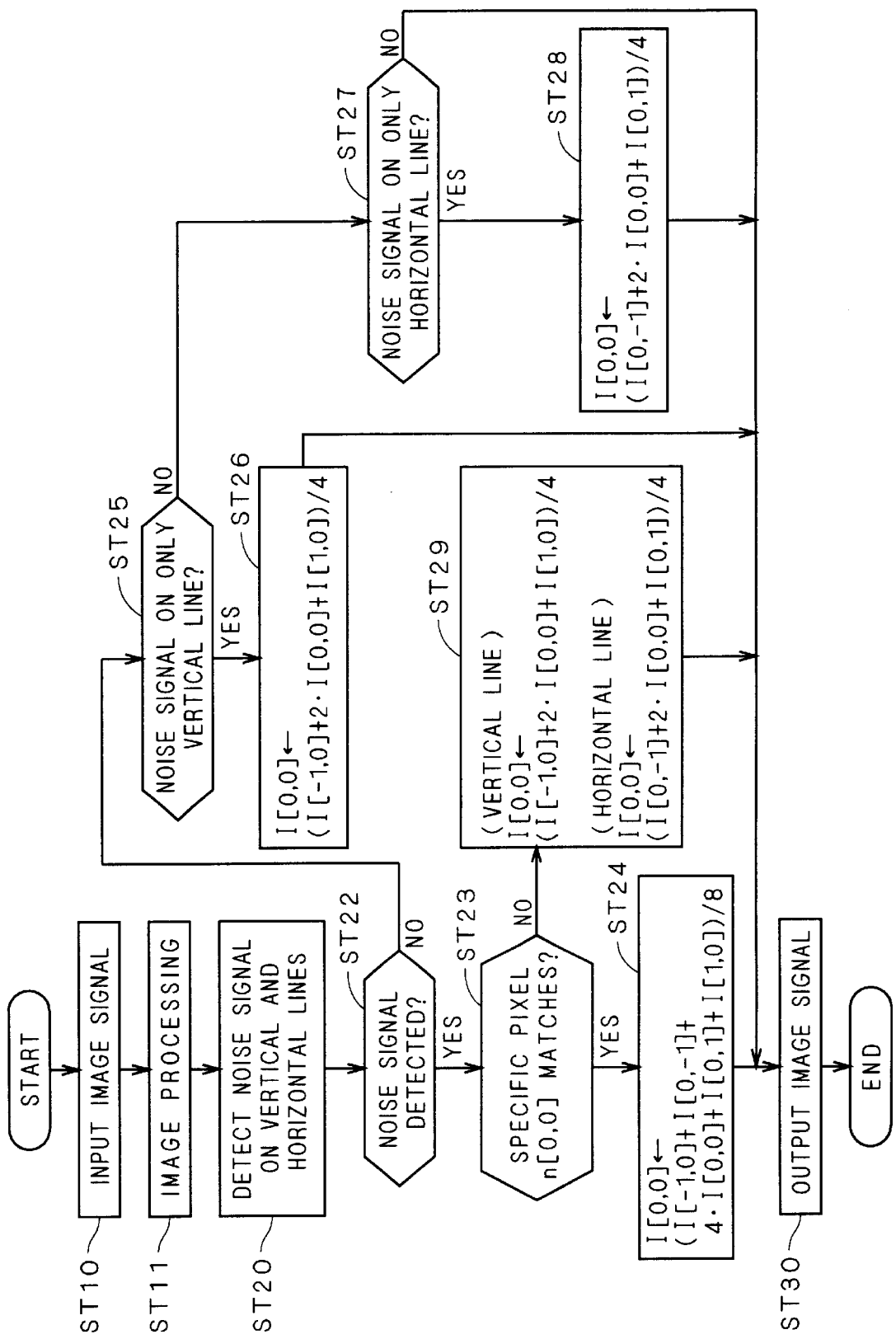
FIG. 9 is a flow chart showing exemplary noise removal processing according to the embodiment 3.
Figure 10:
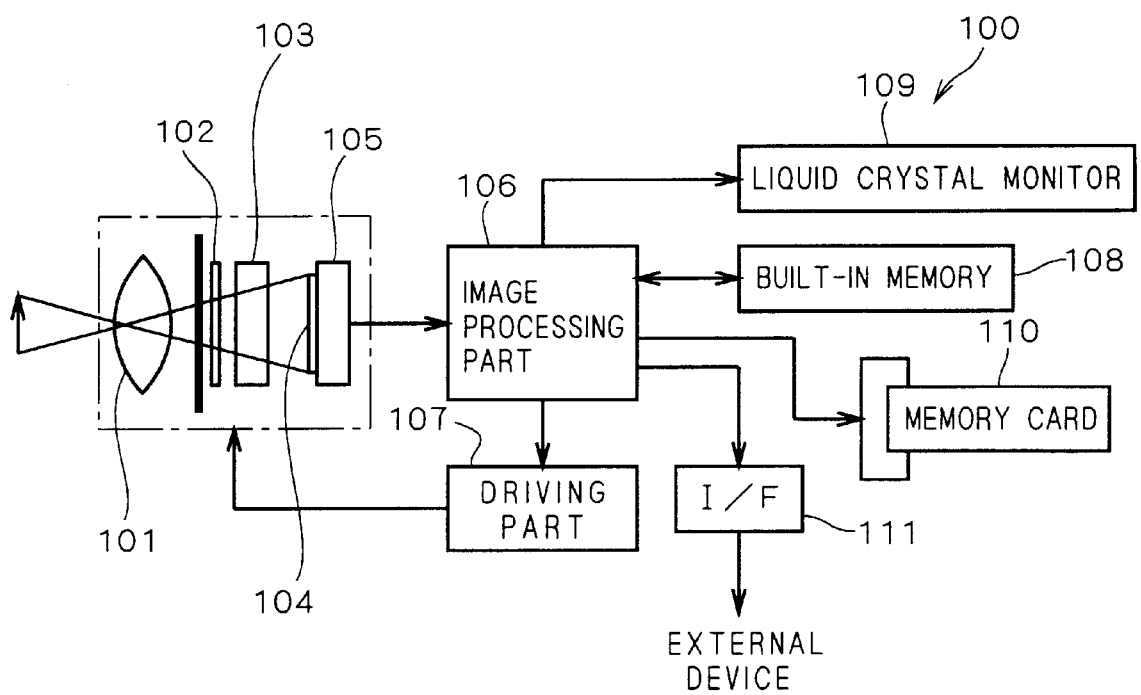
FIG. 10 is a schematic block diagram of a general digital still camera.

FIG. 9 is a flow chart showing exemplary noise removal according to the embodiment 3. This example is described with reference to a case of detecting and correcting five zigzag noise signal levels in each of the vertical line VL2 and the horizontal line HL2 similarly to the aforementioned embodiment 2.

Image signals picked up by an image pickup sensor are A/D converted and thereafter input in an image processing part (ST10) and subjected to the aforementioned image processing (ST11), so that the image signals subjected to image processing are successively stored in five line buffer memories (not shown) at a step S20 and the aforementioned zigzag noise signal level detection is performed on the stored image signals. In other words, a noise signal satisfying any of the aforementioned conditional expressions (C-1) to (C-4) and (D-1) to (D-4) is detected.

Then, whether or not zigzag noise signal levels are detected on both of the vertical line VL2 and the horizontal line HL2, i.e., whether or not both of a noise signal (zigzag noise signal appearing in the vertical direction) satisfying any of the above conditional expressions (C-1) to (C-4) and a noise signal (zigzag noise signal appearing in the horizontal direction) satisfying any of the conditional expressions (D-1) to (D-4) are detected is determined at a step ST22. The process shifts to a step ST23 when it is determined that zigzag noise signals are detected on both of the vertical line VL2 and the horizontal line HL2, for determining whether or not both specific pixels n[0, 0] match with each other. When the noted pixels n[0, 0] of both noise signals match with each other, the process shifts to a step ST24 for executing correction of I[0, 0]←(I[−1, 0]+I[0, −1]+4×I[0, 0]+I[0, 1]+I[1, 0])/8 on the basis of the above formula (F4) and outputting the image signals at a step ST30, so that the noise removal is thereafter ended.

When it is determined that no zigzag noise signals are detected on both of the vertical line VL2 and the horizontal line HL2 in the determination block of the aforementioned step ST22, on the other hand, the process shifts to those following a step ST25. Whether or not a zigzag noise signal is detected only on the vertical line VL2 is determined at the step ST25, and whether or not a zigzag noise signal is detected only on the horizontal line HL2 is determined at a step ST27. When the zigzag noise signal is detected only on the vertical line VL2, correction of I[0, 0]←(I[−1, 0]+2×n[0, 0]+n[1, 0])/4 is executed on the noise signal level I[0, 0] of the specific pixel n[0, 0] on the basis of the above numerical formula (F2) (ST26). When the zigzag noise signal is detected only on the horizontal line HL2, on the other hand, correction of I[0, 0]←(I[0, −1]+2×n[0, 0]+I[0, 1])/4 is executed on the noise signal level I[0, 0] of the specific pixel n[0, 0] (ST28).

When it is determined that the specific pixels n[0, 0] mismatch with each other at the aforementioned step ST23, the processing of the aforementioned steps ST26 and ST28 is executed on the vertical line VL2 and the horizontal line HL2 respectively at a step ST29. Then, the noise removal is ended.

Thus, according to the embodiment 3, it is possible to perform correction on zigzag noise signals appearing on both of vertical and horizontal lines inclusive of a case where specific pixels thereof match with each other. Thus, an image of better quality can be provided.

While the invention has been shown and described in detail, the foregoing description is in all aspects illustrative and not restrictive. It is therefore understood that numerous modifications and variations can be devised without departing from the scope of the invention.

What is claimed is:

1. A method of removing noise from an image signal, comprising steps of:
    (a) detecting a zigzag signal in which a difference between output levels of two spatially adjacent pixels alternately takes positive and negative values at least three times in a spatial pixel arrangement along a prescribed direction; and
    (b) noting a specific pixel among a plurality of pixels corresponding to said zigzag signal and calculating a mean value of the output levels of signal corresponding to said plurality of pixels with reference to said specific pixel for correcting the output level of a signal corresponding to said specific pixel to said mean value.

2. The method of removing noise from an image signal according to claim 1, wherein said zigzag signal is generated as a straight line in said image signal in said step (a).

3. A method of removing noise from an image signal, comprising steps of:
- (a) detecting such a zigzag signal that the difference between the output levels of two adjacent pixels alternately takes positive and negative values at least three times in pixel arrangement along a prescribed direction; and
- (b) noting a specific pixel among a plurality of pixels corresponding to said zigzag signal and calculating a mean value of the output levels of signals corresponding to said plurality of pixels with reference to said specific pixel for correcting the output level of a signal corresponding to said specific pixel to said mean value, wherein said image signal is a two-dimensional image signal formed by horizontal and vertical lines, and said zigzag signal is intersectionally generated in two directions of said horizontal and vertical lines in said image signal in said step (a), said method calculating a weighted mean of the output level of said zigzag signal generated along said two directions with reference to said specific pixel at the intersection of said horizontal and vertical lines for correcting the output level of said signal corresponding to said specific pixel to said weighted mean in said step (b).

4. A method of removing noise from an image signal, comprising steps of:
- (a) detecting such a zigzag signal that the difference between the output levels of two adjacent pixels alternately takes positive and negative values at least three times in pixel arrangement along a prescribed direction; and
- (b) noting a specific pixel among a plurality of pixels corresponding to said zigzag signal and calculating a mean value of the output levels of signals corresponding to said plurality of pixels with reference to said specific pixel for correcting the output level of a signal corresponding to said specific pixel to said mean value, wherein said zigzag signal appears in one frame or one field of said image signal.

5. The method of removing noise from an image signal according to claim 1, wherein said mean value is a weighted mean value.

* * * * *